(12) United States Patent
Hedberg

(10) Patent No.: US 9,039,335 B2
(45) Date of Patent: May 26, 2015

(54) INDEXABLE, DOUBLE-SIDED CUTTING INSERT AND CUTTING TOOL INCLUDING SUCH AN INSERT

(75) Inventor: Stefan Hedberg, Hedemora (SE)

(73) Assignee: SECO TOOLS AB, Fagersta (SE)

( * ) Notice: Subject to any disclaimer, the term of this patent is extended or adjusted under 35 U.S.C. 154(b) by 0 days.

(21) Appl. No.: 14/238,884

(22) PCT Filed: Jun. 11, 2012

(86) PCT No.: PCT/EP2012/061006
§ 371 (c)(1),
(2), (4) Date: Feb. 14, 2014

(87) PCT Pub. No.: WO2013/023801
PCT Pub. Date: Feb. 21, 2013

(65) Prior Publication Data
US 2014/0205388 A1    Jul. 24, 2014

(30) Foreign Application Priority Data

Aug. 16, 2011    (EP) ..................................... 11177659

(51) Int. Cl.
*B23C 5/20*    (2006.01)
*B23C 5/22*    (2006.01)

(52) U.S. Cl.
CPC ............... *B23C 5/205* (2013.01); *Y10T 407/23* (2015.01); *B23C 5/207* (2013.01); *B23C 5/2221* (2013.01); *B23C 2210/0407* (2013.01); *B23C 2210/163* (2013.01); *B23C 5/22* (2013.01)

(58) Field of Classification Search
CPC ........ B23C 5/205; B23C 5/22; B23C 5/2221; B23C 5/207; B23C 2210/0407; B23C 2210/163

USPC ............................................... 407/42, 61, 113
See application file for complete search history.

(56) References Cited

U.S. PATENT DOCUMENTS

| | | | |
|---|---|---|---|
| 5,158,401 A * | 10/1992 | Pawlik ............................ | 407/40 |
| 5,330,295 A * | 7/1994 | Pawlik ............................ | 407/42 |
| 5,951,214 A | 9/1999 | Rothballer et al. | |
| 5,957,629 A * | 9/1999 | Hessman et al. ............... | 407/113 |
| 6,929,428 B1 * | 8/2005 | Wermeister et al. .......... | 407/113 |
| 7,604,441 B2 * | 10/2009 | Bhagath ........................ | 407/113 |
| 2004/0208714 A1 | 10/2004 | Stabel et al. | |
| 2006/0210364 A1 * | 9/2006 | Bellmann et al. ............... | 407/40 |
| 2009/0285646 A1 * | 11/2009 | Oprasic et al. ................. | 407/114 |
| 2010/0080662 A1 * | 4/2010 | Satran et al. .................... | 407/40 |
| 2011/0097164 A1 * | 4/2011 | Choi et al. ..................... | 407/46 |
| 2012/0057943 A1 * | 3/2012 | Zastrozynski et al. .......... | 407/30 |

FOREIGN PATENT DOCUMENTS

| | | | |
|---|---|---|---|
| EP | 104517 A | * | 4/1984 |
| GB | 2298600 A | | 9/1996 |

* cited by examiner

*Primary Examiner* — Daniel Howell
*Assistant Examiner* — Alan Snyder
(74) *Attorney, Agent, or Firm* — Corinne R. Gorski

(57) ABSTRACT

A cutting insert includes a first surface having a first rake surface, a second surface having a second rake surface, a central axis of the insert extending between the first and second surfaces, four side surfaces extending between the first surface and the second surface, and four cutting edges. Each cutting edge has a first cutting edge component and a second cutting edge component and being associated with a respective one of the first and second surfaces and with two respective ones of the side surfaces. The first rake surface is identical to the second rake surface and the first rake surface and the second rake surface are oriented at a 90° angle to each other about the central axis of the insert.

15 Claims, 7 Drawing Sheets

INDEXABLE, DOUBLE-SIDED CUTTING INSERT AND CUTTING TOOL INCLUDING SUCH AN INSERT

RELATED APPLICATION DATA

This application is a §371 National Stage Application of PCT International Application No. PCT/EP2012/061006 filed Jun. 11, 2012 claiming priority of EP Application No. 11177659.7, filed Aug. 16, 2011.

BACKGROUND AND SUMMARY

The present invention relates generally to indexable cutting inserts and, more particularly, to indexable, double-sided cutting inserts.

In machining, particularly machining of metals, rotating tools such as milling tools are often used. It is known to mount indexable cutting inserts on toolholders in such rotating tools to permit use of two or more cutting edges on the cutting insert. Depending upon factors such as the type of material to be machined, the insert may have a positive or negative rake angle, and the insert may be mounted on the toolholder so that the working cutting edge of the insert forms a positive or negative angle with a radius of the toolholder extending from the axis of rotation of the toolholder, and so that the working cutting edge of the insert forms a positive or negative angle with the axis of rotation.

In general, it is desirable to provide the maximum number of cutting edges on a cutting insert so that it can be indexed as many times as possible. The manner in which the insert is mounted on the toolholder is typically a constraint on the number of cutting edges that can be provided.

According to an aspect of the present invention, a cutting insert includes a first surface including a first rake surface, a second surface including a second rake surface, a central axis of the insert extending between the first and second surfaces, four side surfaces extending between the first surface and the second surface, and four cutting edges, each cutting edge having a first cutting edge component and a second cutting edge component and being associated with a respective one of the first and second surfaces and with two respective ones of the side surfaces. The first rake surface is identical to the second rake surface and the first rake surface and the second rake surface are oriented at a 90° angle to each other about the central axis of the insert.

According to another aspect of the present invention, a cutting tool including an insert as described above is also disclosed.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
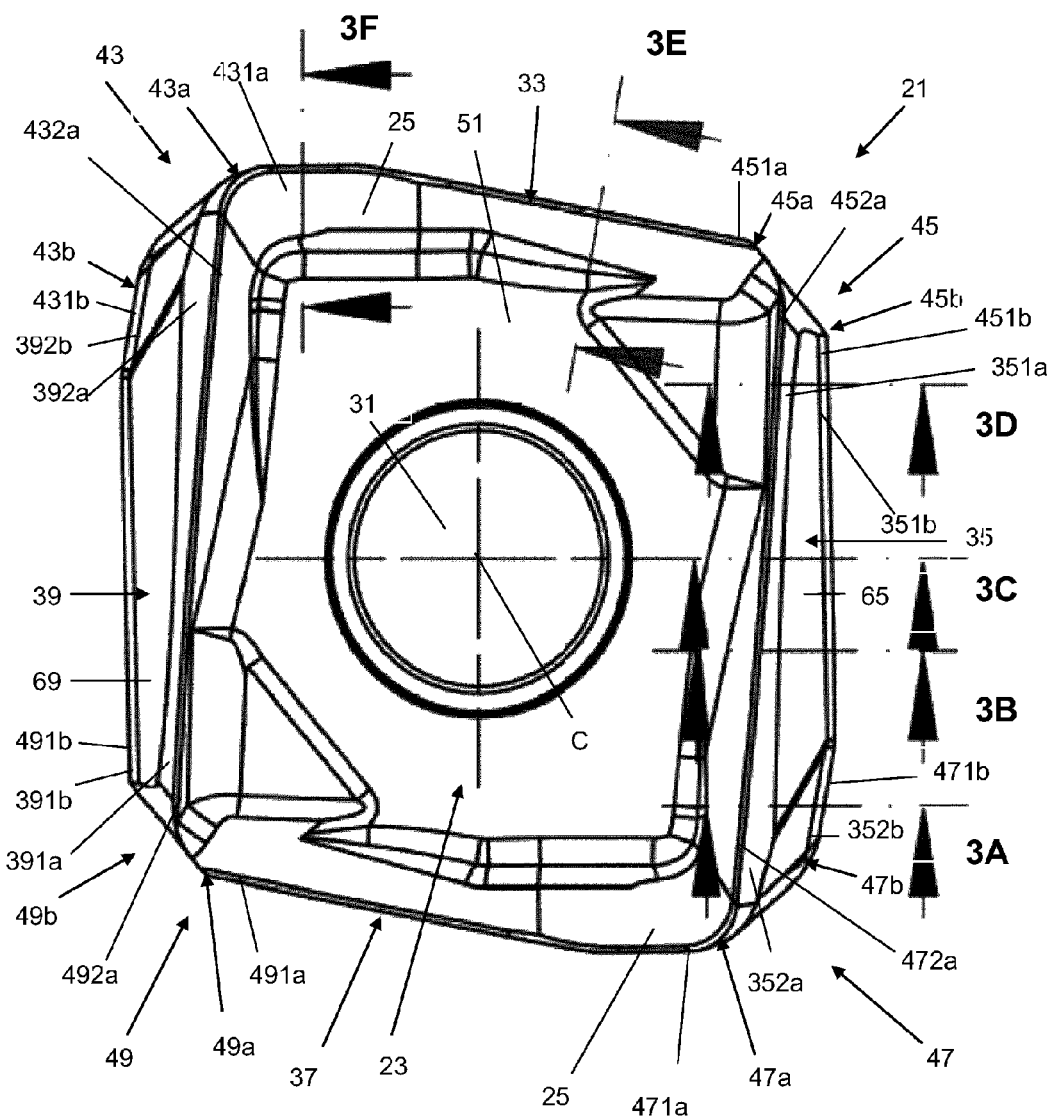
FIGS. 1A-1D show a top view, a left side view, a bottom view, and a right side view of a cutting insert according to an aspect of the present invention.
Figure 1B:
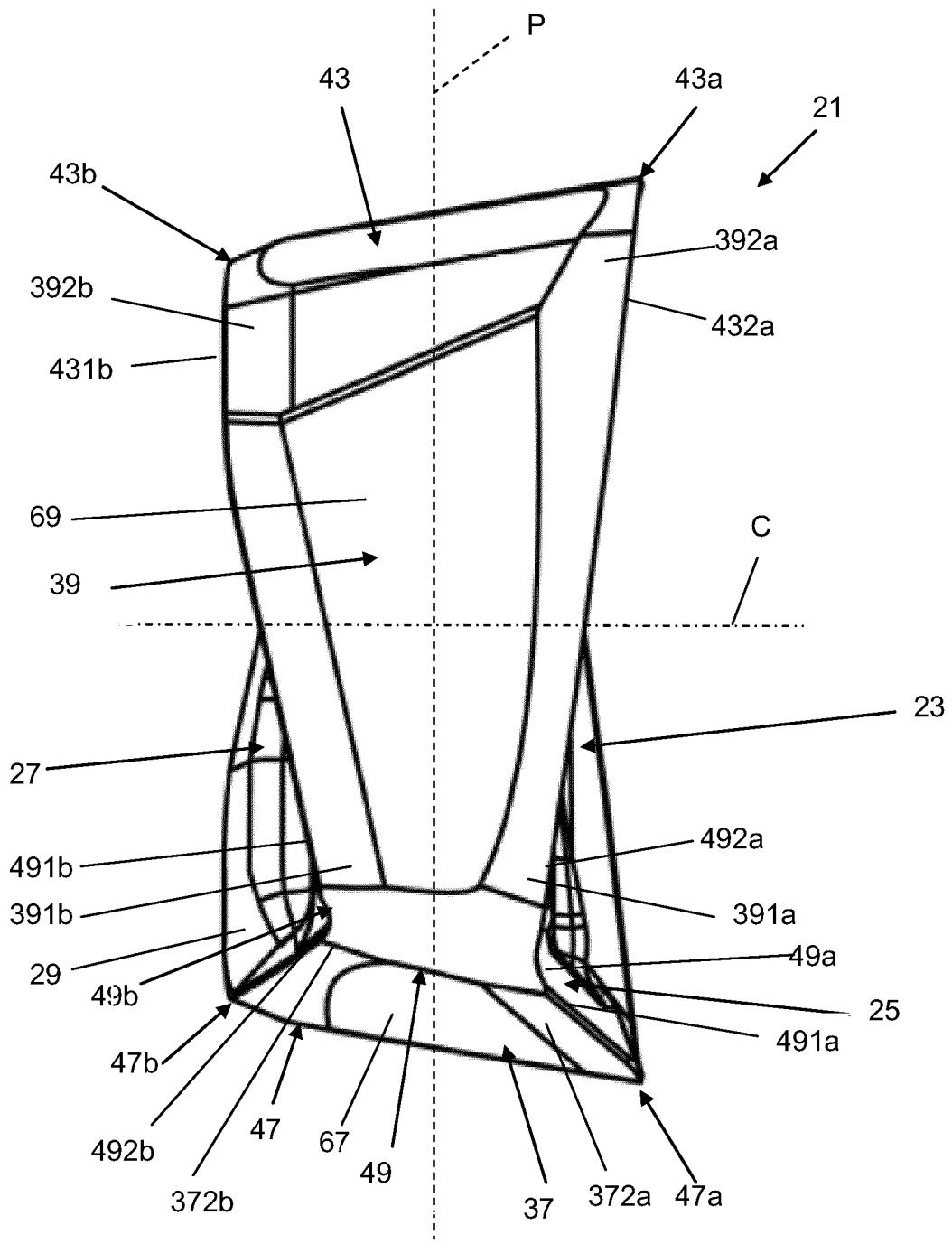

A cutting insert 21 according to an aspect of the present invention is shown in FIGS. 1A-3F. The indexable cutting insert may be manufactured from directly pressed cemented carbide. By the term "cemented carbide" it is here meant WC, TiC, TaC, NbC, etc., in sintered combination with a binder metal such as, for instance, Co or Ni. The cutting insert is preferably at least partly coated with layers of, e.g., $Al_2O_3$, TiN and/or TiCN. In certain cases, it may be justified that the cutting edges consist of soldered superhard materials such as CBN or PCD. The cutting insert 21 includes a first surface 23, which may be called a first major surface, including a first rake surface 25, a second surface 27, which may be called a second major surface, including a second rake surface 29, a central axis C of the insert extending between the first and second surfaces, four side surfaces 33, 35, 37, 39 extending between the first surface and the second surface, four corners 43, 45, 47, and 49, and four cutting edges 43a, 43b, 47a, 47b. Ordinarily, a through hole 31 for receiving a mounting screw (not shown) for mounting the insert 21 to a toolholder (123 shown in phantom in FIG. 4) extends from the first surface 23 to the second surface 27 with the central axis C extending through the center of the through hole. The insert 21 is indexable to permit successive positioning each of the four cutting edges 43a, 43b, 47a, 47b in a working position in the toolholder 123 after a preceding one of the cutting edges becomes worn or damaged.

Each cutting edge 43a, 43b, 47a, 47b has a first cutting edge component 431a, 431b, 471a, 471b, which may be called a minor cutting edge, and a second cutting edge component 432a, 432b, 472a, 472b, which may be called a major cutting edge, and is associated with a respective one of the first and second surfaces 23 and 27 and with two respective ones of the side surfaces 33, 35, 37, 39. Specifically, the first cutting edge 43a is associated with the first surface 23 and the side surfaces 33 and 39; the second cutting edge 43b is associated with the second surface 27 and the side surfaces 33 and 39; the third cutting edge 47a is associated with the first surface 23 and the side surfaces 35 and 37; and the fourth cutting edge 47b is associated with the second surface 27 and the side surfaces 35 and 37.

Two of the four cutting edges, edges 43a and 47a, are disposed at opposite corners 43 and 47 of the insert 21 from each other, and the other two of the four cutting edges, edges 43b and 47b, are disposed at opposite corners of the insert from each other. The edges 43a and 47a are each disposed at the same corners 43 and 47, respectively, of the insert 21 as respective ones of the corners 43b and 47b. By this configuration, when the insert 21 is flipped 180° around its central axis C in the sense that, for example, the insert is turned from the first rake surface 25 being face up to the second rake surface 29 being face up, the second rake surface can be identical to the first rake surface, except that it will appear to have been rotated 90° about the axis of the insert. Stated otherwise, the first rake surface 25 can be identical to the second rake surface 29 and the first rake surface and the second rake surface are oriented at a 90° angle to each other about the central axis C of the insert 21. Two cutting edges 43a and 47a are disposed proximate an intersection of the first rake surface 25 with two of the four side surfaces 33, 35, 37, 39, and the other two cutting edges 43b and 47b are disposed proximate an intersection of the second rake surface 29 with two of the four side surfaces.

Figure 1C:
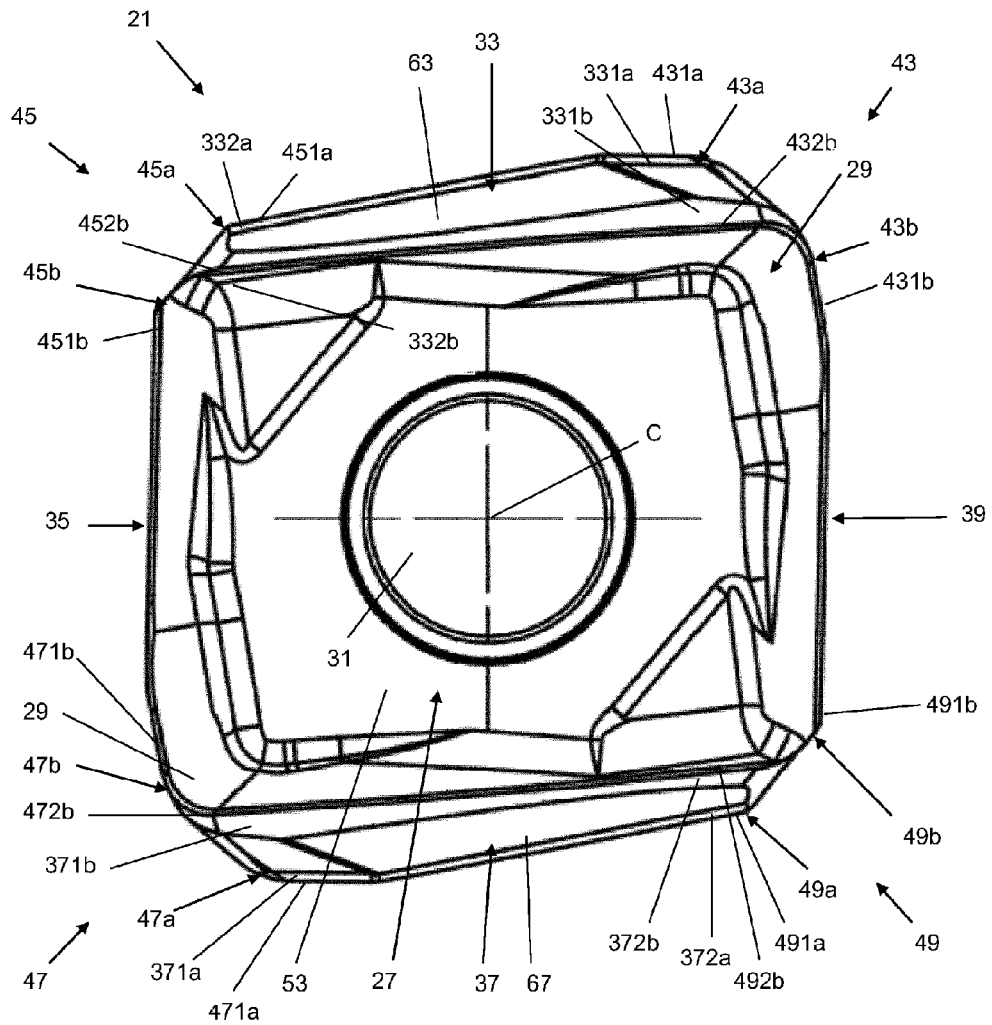
Figure 1D:
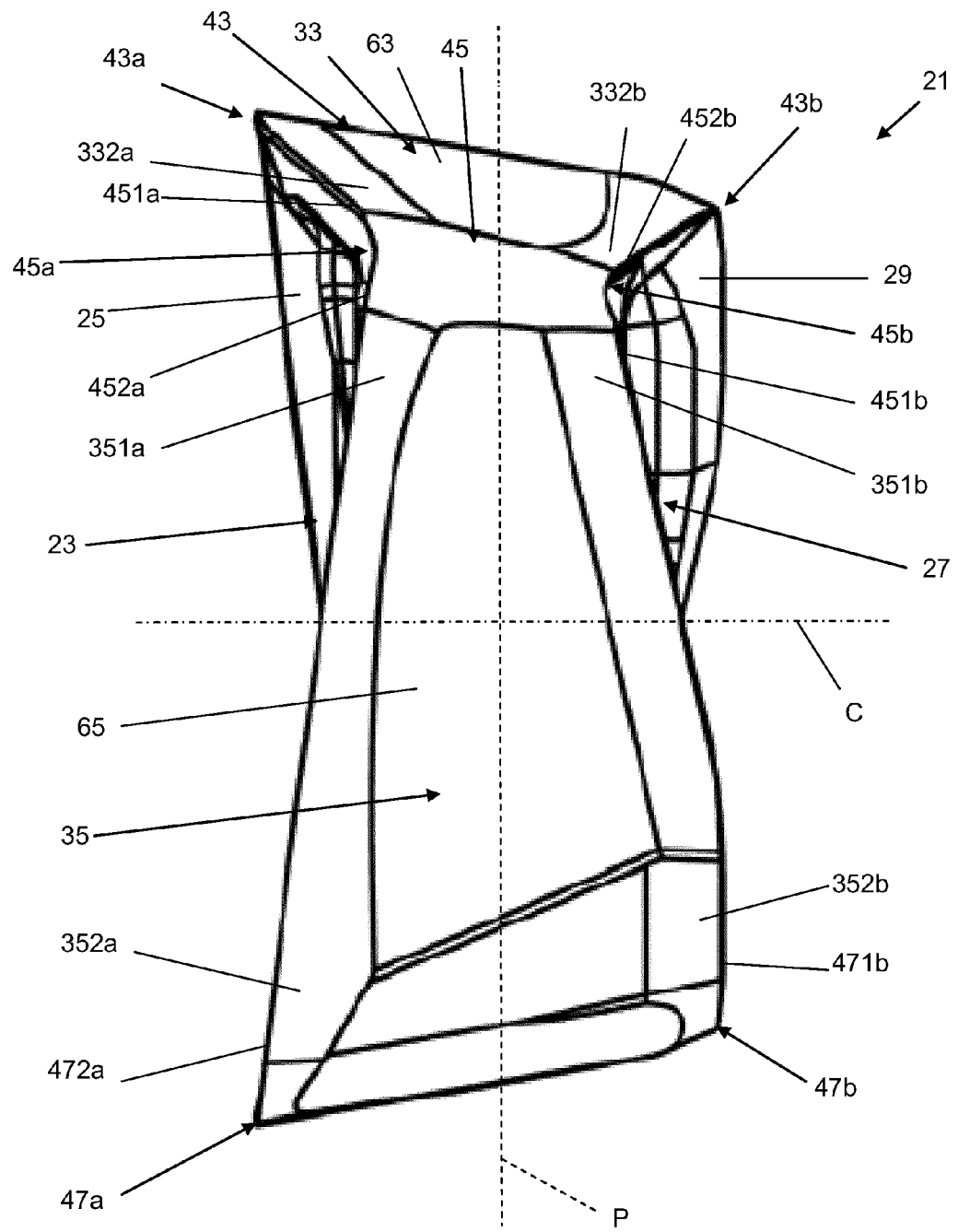
Figures 2A, 2B:
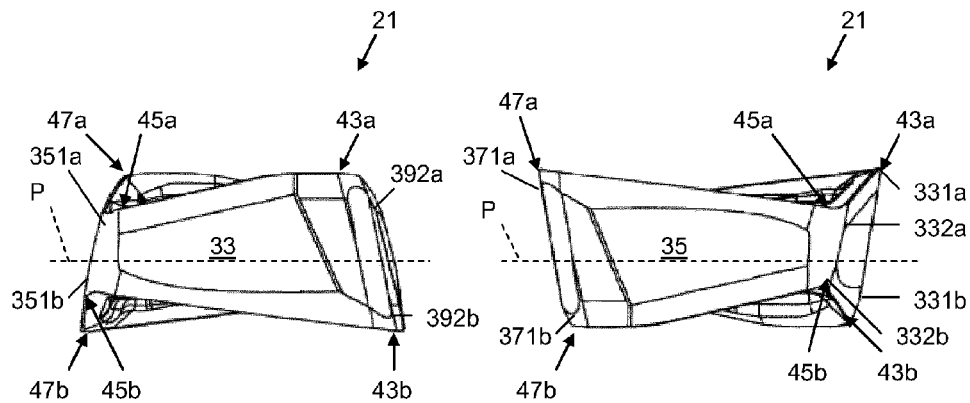
FIGS. 2A-2D show a first side, a second side, a third side, and a fourth side view of a cutting insert according to an aspect of the present invention.
Figures 2C, 2D:
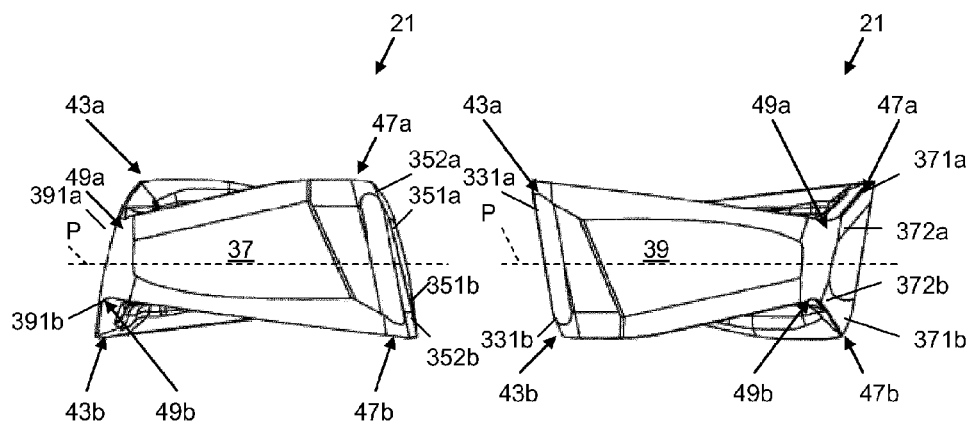

The insert 21 thus described can be provided with four identical cutting edges 43a, 43b, 47a, 47b that are indexable by turning the insert 180° about its central axis to expose two cutting edges on one side of the insert, and flipping the insert over and turning the insert 90° about the central axis C of the insert as seen with reference to FIGS. 1A and 1C, with two edges 43a and 47a on one side (surface 23) of the insert and two edges 43b and 47b on the other side (surface 27) of the insert. The first surface 23 and the second surface 27 are ordinarily identical.

Particularly as seen with reference to FIGS. 1B, 1D, and 2A-2D, each cutting edge 43a, 43b, 47a, 47b comprises a first clearance surface or a first surface component 331a, 392b, 371a, 352b associated with the first cutting edge component 431a, 431b, 471a, 471b, respectively, of the cutting edge and forming an acute angle with a plane P (shown via dotted lines in FIGS. 1B, 1D, and 2A-2D) perpendicular to the central axis C, and a second surface component 392a, 331b, 352a, 371b associated with the second cutting edge component 432a, 432b, 472a, 472b of the cutting edge and forming an obtuse angle with the plane.

The first surface 23 comprises a first insert supporting surface 51 and the second surface 27 comprises a second insert supporting surface 53. The first and second insert supporting surfaces 51 and 53 are ordinarily substantially planar and perpendicular to the central axis C of the insert 21. The first and second insert supporting surfaces 51 and 53 are designed to contact abutment surfaces (not shown) in a recess of a toolholder (FIG. 4) in which the insert 21 is mounted. Each side surface 33, 35, 37, 39 also ordinarily comprises a side insert supporting surface 63, 65, 67, 69, respectively, for contacting side abutment surfaces (not shown) in the toolholder recess. Ordinarily, the insert 21 is supported in recess by one insert supporting surface and two side insert supporting surfaces contacting one abutment surface and two side abutment surfaces.

Ordinarily, an angle between the first cutting edge component 431a, 431b, 471a, 471b and the respective second cutting edge component 432a, 432b, 472a, 472b of each of the four cutting edges 43a, 43b, 47a, 47b is 90° or less. The insert 21 also comprises four non-cutting edges 45a, 45b, 49a, 49b, each non-cutting edge being disposed on a different corner 45 and 49 of the insert than the corners 43 and 47 at which the four cutting edges 43a, 43b, 47a, 47b are disposed. Each non-cutting edge 45a, 45b, 49a, 49b comprises a first non-cutting edge component 451a, 451b, 491a, 491b and a second non-cutting edge component 452a, 452b, 492a, 492b. For each non-cutting edge 45a, 45b, 49a, 49b, an angle between the first non-cutting edge components 451a, 451b, 491a, 491b and respective second non-cutting edge components 452a, 452b, 492a, 492b of the non-cutting edge is ordinarily 90° or greater.

Particularly as seen with reference to FIGS. 1B, 1D, and 2A-2D, each non-cutting edge 45a, 45b, 49a, 49b comprises a first surface component 332a, 351b, 372a, 391b associated with the first cutting edge component 451a, 451b, 491a, 491b, respectively, of the cutting edge and forming an acute angle with a plane P (shown via dotted lines in FIGS. 1B and 1D) perpendicular to the central axis C, and a second surface component 351a, 332b, 391a, 372b associated with the second cutting edge component 452a, 452b, 492a, 492b of the cutting edge and forming an obtuse angle with the plane.

Figure 3A:
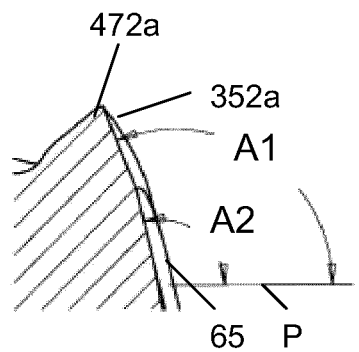
FIGS. 3A-3F are cross-sectional views of a portion of the insert of FIG. 1A taken at Sections 3A-3F.

FIG. 3A shows a section of the insert 21 at Section 3A of FIG. 1A showing that a second surface component adjacent a second cutting edge component—in this case, second surface component 352a beneath second cutting edge component 472a—forms an obtuse angle A1 with the plane P and, further from the second cutting edge component, forms a smaller obtuse angle A2. In an embodiment of the insert 21, the angle A1 is 111.98° and the angle A2 is 103°.

Figure 3B:
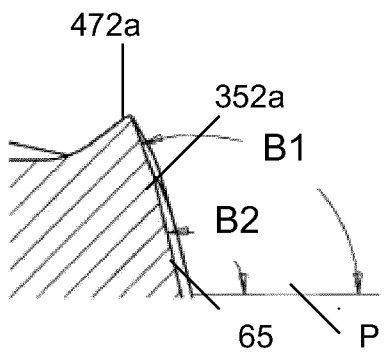

FIG. 3B shows the section of the insert 21 at Section 3B of FIG. 1A showing that the second surface component 352a adjacent the second cutting edge component 472a forms an obtuse angle B1 with the plane P and, further from the second cutting edge component, forms a smaller obtuse angle B2. In an embodiment of the insert 21, the angle B1 is 109.9° and the angle B2 is 103°.

Figure 3C:
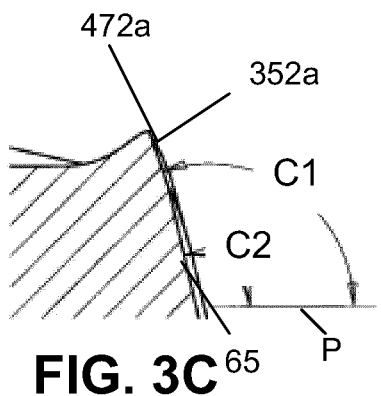

FIG. 3C shows the section of the insert 21 at Section 3C of FIG. 1A showing that the second surface component 352a adjacent the second cutting edge component 472a forms an obtuse angle C1 with the plane P and, further from the second cutting edge component, forms a smaller obtuse angle C2. In an embodiment of the insert 21, the angle C1 is 108.67° and the angle C2 is 103°.

Figure 3D:
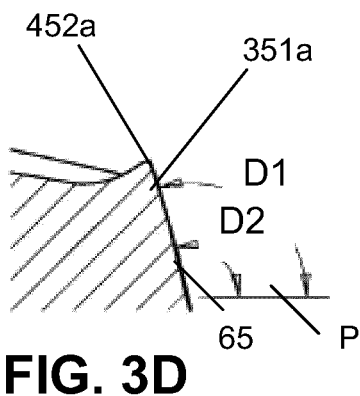

FIG. 3D shows a section of the insert 21 at Section 3D of FIG. 1A showing that a second surface component adjacent a second cutting edge component—in this case, second surface component 351a beneath second non-cutting edge component 452a—forms an obtuse angle D1 with the plane P and, further from the second non-cutting edge component, forms a smaller obtuse angle D2. In an embodiment of the insert 21, the angle D1 is 106.35° and the angle D2 is 103°.

Figure 3E:
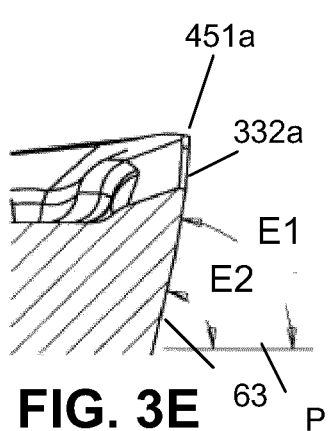

FIG. 3E shows a section of the insert 21 at Section 3E of FIG. 1A showing that a first surface component adjacent a first non-cutting edge component—in this case, first surface component 332a beneath first non-cutting edge component 451a—forms an acute angle E1 with the plane P and, further from the second cutting edge component, forms a smaller acute angle E2. In an embodiment of the insert 21, the angle E1 is 80.86° and the angle E2 is 77°.

Figure 3F:
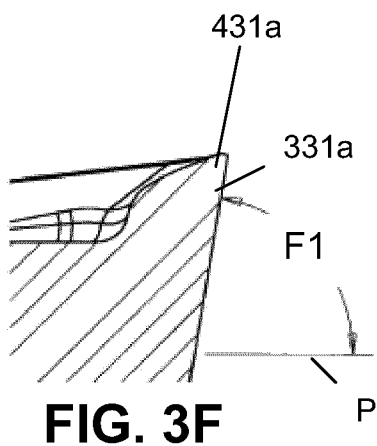

FIG. 3F shows a section of the insert 21 at Section 3F of FIG. 1A showing that a first surface component adjacent a first cutting edge component—in this case, first surface component 331a beneath first cutting edge component 431a—forms an acute angle F1 with the plane P. In an embodiment of the insert 21, the angle F1 is 80.7°.

In the sections 3A-3D and in the sections 3E-3F it will be seen that the surface adjacent the edge is not necessarily at a constant angle with the plane P, i.e., it can be twisted. It will also be seen that, in the sections 3A-3D, the angles A2, B2, C2, and D2 can be the same. The insert supporting surface 65 in the side surface 35 will ordinarily be a flat surface and the angles A2, B2, C2, and D2 are measured from the insert supporting surface 65 to the plane P. The insert supporting surface 63 in the side surface is seen in FIG. 3E and is also ordinarily a flat surface. The angle E2 will ordinarily be equal to 180° minus the angle that angles A2, B2, C2, and D2 form with the plane P. The insert supporting surface 63 does not extend to section 3F.

Figure 4:
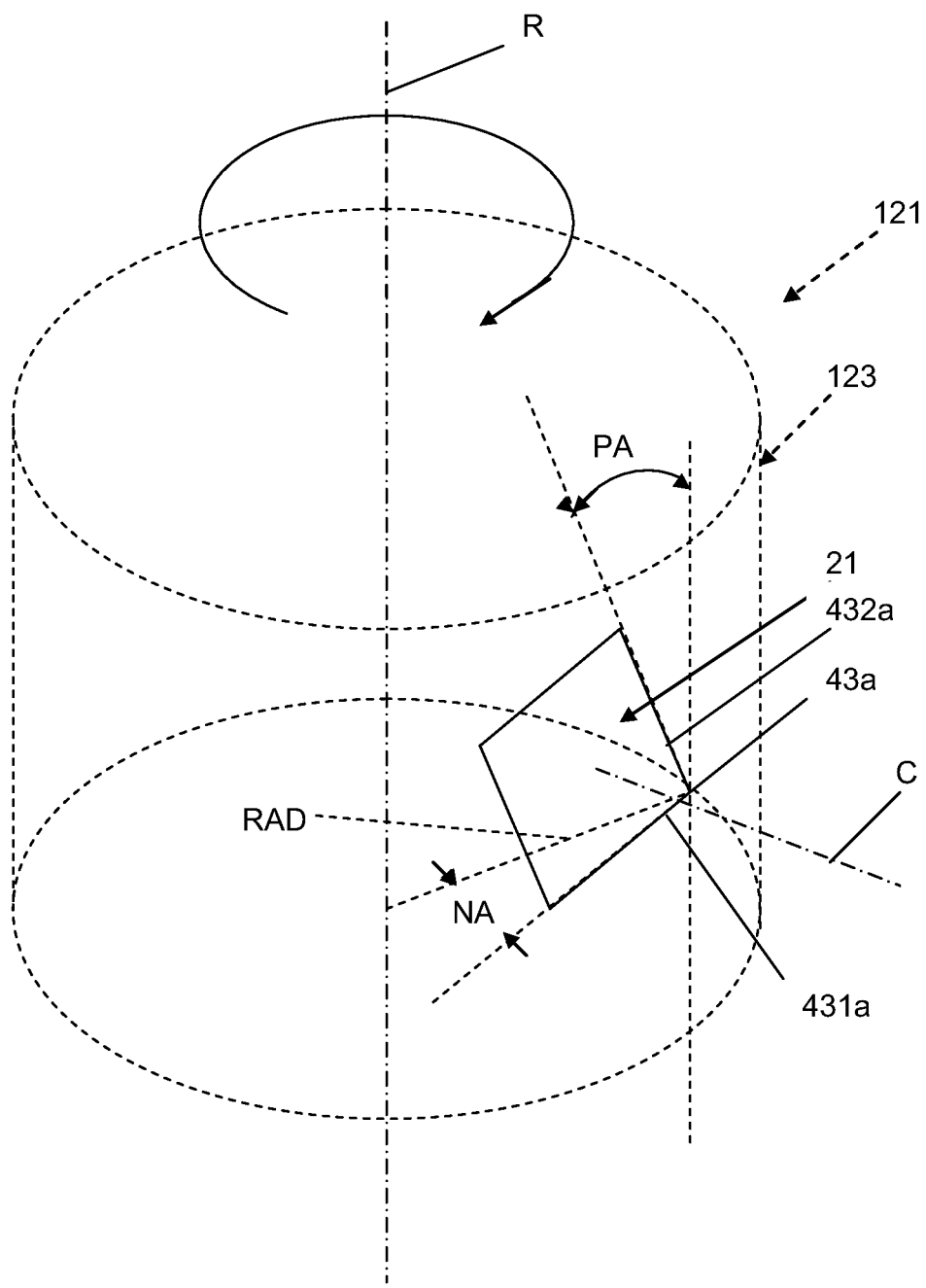
FIG. 4 is a perspective, schematic view of a cutting tool according to an aspect of the present invention.

As seen in FIG. 4, a cutting tool 121 according to an aspect of the present invention includes one or more cutting inserts 21 (showing only the first surface 23 of the insert for purposes of illustration) and a toolholder 123 (shown in phantom). The toolholder 123 comprises at least one recess in which the cutting insert 21 is mounted so that one of the cutting edges 43a, 43b, 47a, 47b of the cutting insert is in a working position.

The toolholder 123 comprises an axis of rotation R. The cutting insert 21 revolves around the axis of rotation R when the toolholder 123 is rotated around the axis of rotation. The recess can be configured such that the second cutting edge component 432a, 432b, 472a, or 472b of the cutting edge 43a, 43b, 47a, or 47b in the working position forms a positive angle PA with the axis of rotation R, i.e., an axially positive angle. The positive orientation of the second cutting edge component 432a, 432b, 472a, or 472b facilitates a smoother cut and less deflection of the cutting tool, as well as less vibration, largely due to reduced cutting forces.

The recess can also be configured such that the first cutting edge component 431a, 431b, 471a, or 471b of the cutting edge 43a, 43b, 47a, or 47b in the working position forms a negative angle NA with respect to a radial line RAD extending from the axis of rotation R, i.e., a radially negative angle, which facilitates orienting the insert 21 so that the second surface component 392a, 331b, 352a, 371b is disposed relative to the surface of the workpiece below the second cutting edge component 432a, 432b, 472a, or 472b so that the second surface component functions as a wiper surface after the second cutting edge component. When the insert 21 is mounted in the recess of the toolholder 123, the central axis C of the insert can be substantially perpendicular to the axis of rotation R while the radially extending first cutting edge component 431a, 431b, 471a, or 471b forms a radially negative angle and while the axially extending second cutting edge component 432a, 432b, 472a, or 472b forms an axially positive angle.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 11177659.7, from which this application claims priority, are incorporated herein by reference.

What is claimed is:

1. A cutting insert comprising:
    a first surface including a first rake surface;
    a second surface including a second rake surface, a central axis of the insert extending between the first and second surfaces;
    four side surfaces extending between the first surface and the second surface;
    four cutting edges, each cutting edge having a first cutting edge component and a second cutting edge component and being associated with a respective one of the first and second rake surfaces and with two respective ones of the side surfaces, wherein when the insert is flipped 180° around the central axis the first rake surface is identical to the second rake surface and the first rake surface and the second rake surface are oriented at a 90° angle to each other about the central axis of the insert.

2. The cutting insert as set forth in claim 1, wherein each cutting edge comprises a first surface component associated with the first cutting edge component of the cutting edge and forming an acute angle with a plane perpendicular to the central axis, and a second surface component associated with the second cutting edge component of the cutting edge and forming an obtuse angle with the plane.

3. The cutting insert as set forth in claim 2, wherein an angle between the first and second cutting edge components of each of the four cutting edges is 90° or less.

4. The cutting insert as set forth in claim 1, wherein a first two cutting edges of the four cutting edges are disposed at opposite corners of the insert from each other, and a second two cutting edges of the four cutting edges are disposed at opposite corners of the insert from each other.

5. The cutting insert as set forth in claim 1, wherein each of the first two cutting edges of the four cutting edges is disposed at the same corner of the insert as a respective one of the second two cutting edges of the four cutting edges.

6. A cutting insert comprising:
    a first surface including a first rake surface, the first surface including a first insert supporting surface;
    a second surface including a second rake surface, the second surface including a second insert supporting surface, a central axis of the insert extending between the first and second surfaces;
    four side surfaces extending between the first surface and the second surface;
    four cutting edges, each cutting edge having a first cutting edge component and a second cutting edge component and being associated with a respective one of the first and second rake surfaces and with two respective ones of the side surfaces, wherein when the insert is flipped 180° around the central axis the first rake surface is identical to the second rake surface and the first rake surface and the second rake surface are oriented at a 90° angle to each other about the central axis of the insert.

7. The cutting insert as set forth in claim 6, wherein the first and second insert supporting surfaces are substantially planar and perpendicular to the central axis of the insert.

8. The cutting insert as set forth in claim 1, wherein a through hole extends from the first surface to the second surface.

9. The cutting insert as set forth in claim 1, wherein a first two of the four cutting edges are disposed proximate an intersection of the first rake surface with two of the four side surfaces, and a second two of the four cutting edges are disposed proximate an intersection of the second rake surface with two of the four side surfaces.

10. The cutting insert as set forth in claim 1, wherein each of the first and second surfaces and each side surface comprises an insert supporting surface and in that each cutting edge has a minor cutting edge and a major cutting edge.

11. The cutting insert as set forth in claim 1, wherein the insert comprises four non-cutting edges, each non-cutting edge being disposed on different corners of the insert than the four cutting edges.

12. A cutting tool comprising:
    a cutting insert having a first surface including a first rake surface, a second surface including a second rake surface, a central axis of the insert extending between the first and second surfaces, four side surfaces extending between the first surface and the second surface, and four cutting edges, each cutting edge having a first cutting edge component and a second cutting edge component being associated with a respective one of the first and second surfaces and with two respective ones of the side surfaces, wherein when the insert is flipped 180° around the central axis the first rake surface is identical to the second rake surface and the first rake surface and the second rake surface are oriented at a 90° angle to each other about the central axis of the insert; and
    a toolholder including at least one recess in which the cutting insert is mounted so that one of cutting edges of the cutting insert is in a working position, the toolholder having an axis of rotation, the cutting insert revolving around the axis of rotation when the toolholder is rotated around the axis of rotation.

13. The cutting tool as set forth in claim 12, wherein the recess is configured such that the second cutting edge component of the cutting edge in the working position forms a positive angle with the axis of rotation.

14. The cutting tool as set forth in claim 12, wherein the recess is configured such that the first cutting edge component of the cutting edge in the working position forms a negative angle with respect to a radius extending from the axis of rotation.

15. The cutting tool as set forth in claim 12, wherein the central axis of the insert is substantially perpendicular to the axis of rotation.

\* \* \* \* \*